US012723958B2

(12) United States Patent
Ma et al.

(10) Patent No.: US 12,723,958 B2
(45) Date of Patent: Sep. 1, 2026

(54) IN-SITU MICRO-NANO IMPACT INDENTATION TESTING INSTRUMENT

(71) Applicant: JILIN UNIVERSITY, Changchun (CN)

(72) Inventors: Zhichao Ma, Changchun (CN); Guoxiang Shen, Changchun (CN); Jiazheng Sun, Changchun (CN); Wei Zhang, Changchun (CN); Hongcai Xie, Changchun (CN); Shuai Tong, Changchun (CN); Junming Xiong, Changchun (CN); Zixin Guo, Changchun (CN); Wenyang Zhao, Changchun (CN); Cong Li, Changchun (CN); Yicheng Li, Changchun (CN); Boyi Kou, Changchun (CN); Zaizheng Yang, Changchun (CN); Jiakai Li, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 265 days.

(21) Appl. No.: 18/751,245

(22) Filed: Jun. 22, 2024

(65) Prior Publication Data

US 2025/0314571 A1 Oct. 9, 2025

(30) Foreign Application Priority Data

Apr. 8, 2024 (CN) ......................... 202410412329.2

(51) Int. Cl.
*G01N 3/317* (2006.01)

(52) U.S. Cl.
CPC ....... *G01N 3/317* (2013.01); *G01N 2203/001* (2013.01); *G01N 2203/0051* (2013.01);
(Continued)

(58) Field of Classification Search
CPC ............. G01N 3/317; G01N 2203/001; G01N 2203/0051; G01N 2203/0226;
(Continued)

(56) References Cited

U.S. PATENT DOCUMENTS 11,635,361 B2 * 4/2023 Zhao ........................ G01N 3/08
73/800

FOREIGN PATENT DOCUMENTS

| | | | | |
|---|---|---|---|---|
| CN | 108072580 A | * | 5/2018 | G01N 3/48 |
| CN | 108072581 A | * | 5/2018 | G01N 3/54 |
| CN | 115979850 A | * | 4/2023 | |

OTHER PUBLICATIONS

English translation of CN-108072581 from iq.ip.com.*
English translation of CN-108072580 from iq.ip.com.*
English translation of CN-115979850 from iq.ip.com.*

* cited by examiner

*Primary Examiner* — Kristina M Deherrera
*Assistant Examiner* — Jean F Morello
(74) *Attorney, Agent, or Firm* — Birchwood IP

(57) ABSTRACT

The present invention relates to an in-situ micro-nano impact indentation testing instrument, falling within the technical field of material micromechanical testing. The instrument comprises a nitrogen generation module, an environmental chamber, a high/low temperature loading module, an optical-infrared in-situ monitoring module, an electromagnetic-piezoelectric coupling impact module, etc. After the nitrogen is introduced into the environmental chamber and the test area is determined by microscopic imaging, the electromagnetic-piezoelectric coupling impact module can drive an indenter to indent a specimen. An acoustic emission sensor embedded in the high/low temperature loading module can monitor the surface crack propagation of the specimen. The optical-infrared in-situ
(Continued)

monitoring module can perform real-time high-speed optical imaging and infrared imaging on the impact indentation process. The present invention can perform micro-nano impact indentation testing on the material at high or low temperatures.

9 Claims, 4 Drawing Sheets

(52) U.S. Cl.
CPC ................ *G01N 2203/0226* (2013.01); *G01N 2203/0228* (2013.01); *G01N 2203/0244* (2013.01)

(58) Field of Classification Search
CPC ... G01N 2203/0228; G01N 2203/0244; G01N 3/068; G01N 3/42
See application file for complete search history.

8.7
8.8
8.9
8.10
8.11
8.12
8.13
8.14
8.15
8.6
8.5
8.4
8.3
8.2
8.1
8.16
8.17
8.18
8.19
8.20
8.21

IN-SITU MICRO-NANO IMPACT INDENTATION TESTING INSTRUMENT

CROSS-REFERENCE TO RELATED APPLICATIONS

This application claims priority to Chinese Patent Application No. 202410412329.2, filed on Apr. 8, 2024, which is hereby incorporated by reference in its entirety.

TECHNICAL FIELD

The present invention relates to the technical field of material micromechanical property testing technology, particularly concerning an in-situ micro-nano impact indentation testing device that integrates high/low temperature impact indentation testing alongside optical-infrared-acoustic emission in-situ monitoring capabilities. The device facilitates performing impact indentation tests on specimens under high temperatures (range from room temperature to 1000° C.) or low temperatures (range from −40° C. to room temperature), collecting pertinent data through high-precision sensors. Further processing and analysis of the collected data yields the dynamic indentation mechanical properties of the materials. Additionally, the device is capable of simultaneous multi-parameter characterization surface morphology-temperature of distribution-defect nucleation in the specimen micro-region by integrating an in-situ monitoring module, thus revealing the evolution of mechanical properties and deformation damage mechanisms under high/low temperature impact indentation conditions.

BACKGROUND

The Common methods for testing the micromechanical properties of materials predominantly include micro-nanoindentation and scratch testing, as well as micro-electromechanical system testing. Thereinto, the conventional micro-nano indentation testing involves statically indenting a specimen at room temperature and obtaining mechanical property parameters such as hardness, elastic modulus and fracture toughness through recorded load-displacement data, which has a great application value for static mechanical property analysis of materials. However, considering that some critical materials are in service in high or low temperature operating environments and are subject to high strain rate loads, conventional indentation testing methods no longer meet the testing requirements of the above engineering materials. In addition, conventional nanoindentation instruments can only acquire mechanical property parameters without the ability to observe localized damage, crack propagation, and other behaviors of the material during the indentation process. Therefore, it is necessary to develop a specific device that simulates high/low temperature impact conditions for materials, complemented by appropriate in-situ equipment to achieve parallel in-situ monitoring of multiple parameters. This would enable the revelation of the micromechanical properties, behaviors, and deformation damage mechanisms of materials under different temperatures and varying impact strain rates, thus addressing the limitations of traditional test methods applied in extreme conditions.

Considerable research has been conducted by numerous scholars in the field of material micromechanical property testing, particularly focusing on static nanoindentation testing devices, achieving notable outcomes. However, investigations into dynamic indentation testing devices have been relatively scarce, and even fewer studies have explored the integration of high/low temperature environments with in-situ monitoring modules within such devices. Preliminary investigations indicate that, currently, there exists no apparatus or instrument worldwide that concurrently integrates high/low temperature impact indentation testing with in-situ monitoring capabilities. Furthermore, common high/low temperature impact dynamics testing is typically performed by augmenting split Hopkinson pressure bar (SHPB) with high/low temperature chambers. The SHPB involves firing a bullet into the incident bar to transmit stress waves through the specimen and onto the transmission bar behind it while maintaining the specimen at high (or low) temperatures inside a high-temperature (or low-temperature) chamber. The data is recorded by the dynamic sensors, and further processed to calculate the mechanical properties of the material under high (or low) temperatures and high strain rates. However, the SHPB with a large size, has a high requirement on a placing field, specimen size and energy consumption, and is easy to cause high-temperature oxidation or low-temperature frosting corrosion of the specimen due to poor sealing performance. Therefore, it is urgent to develop an in-situ testing instrument capable of achieving high/low temperature impact indentation for performing mechanical property testing and micromechanical behavior characterization of the material at extreme temperatures and high strain rates.

SUMMARY

An objective of the present invention is to provide an in-situ micro-nano impact indentation testing instrument, which solves low indentation strain rate, invisible impact indentation, incompatible high/low temperature environments in the prior art. The present invention performs high-temperature (room temperature to 1000° C.) or low-temperature (−40° C. to room temperature) impact indentation testing on the material in the nitrogen atmosphere. The test temperature is adjustable, the impact speed and the indentation strain rate are controllable, the dynamic load, the displacement and other related data can be obtained through a high-precision sensor, the mechanical parameters such as the impact toughness and dynamic hardness of the material are further obtained, and the information such as surface morphology-temperature distribution-defect nucleation of a micro-area of the specimen is obtained by combining with an optical-infrared-acoustic emission in-situ monitoring system consisting of a high-speed camera, an infrared thermal imager and an acoustic emission sensor, so that the dynamic mechanical property evolution law and the deformation damage mechanism of the material at high temperature or low temperature are revealed.

The above objective of the present invention is implemented through the following technical solutions.

An in-situ micro-nano impact indentation testing instrument comprises a host, an electric control module, a vibration isolation shell, a nitrogen generation module, an environmental chamber, a high/low temperature loading module, an optical-infrared in-situ monitoring module, an electromagnetic-piezoelectric coupling impact module and a microscopic imaging module; a high-temperature loading unit and a low-temperature loading unit of the high/low-temperature loading module are mounted in parallel on a right side wall of the environmental chamber, an optical imaging unit and an infrared imaging unit of the optical-infrared in-situ monitoring module are respectively arranged on a left side wall and a rear side wall of the environmental chamber, and both the electromagnetic-piezoelectric coupling impact module and a microscopic imaging module are mounted at a bottom of the environmental chamber; the electromagnetic-piezoelectric coupling impact module 8 is provided with an indenter that horizontally impacts a high-temperature specimen clamped on the high-temperature loading unit on the right side under the driving of an electromagnetic linear motor and a piezoelectric stack; both the high-temperature loading unit and the low-temperature loading unit are fixed on the same horizontal sliding rail, and a motor on the horizontal sliding rail drives the low-temperature loading unit to move to a front side of the electromagnetic-piezoelectric coupling impact module, so that the switching from a high-temperature impact indentation test to a low-temperature impact indentation test is completed; in-situ monitoring is performed on the testing process by the optical-infrared in-situ monitoring module combined with a second acoustic emission sensor and a first acoustic emission sensor in the high-temperature loading unit and the low-temperature loading unit; and the microscopic imaging module is configured to select a test area before impact indentation and observe residual morphology after impact indentation.

The high/low temperature loading module comprises a high-temperature loading unit and a low-temperature loading unit; the low-temperature loading unit is configured to perform low-temperature loading on a specimen; a first vertical sliding table of the low-temperature loading unit is mounted on a horizontal sliding rail, a first bearing plate of the first vertical sliding table is connected to a cooling platform, and a refrigerating fluid stored in the cooling platform flows into a micro-channel pipeline inside a micro-channel cold platform through an inlet pipeline and then flows out through an outlet pipeline to return to the cooling platform; a low-temperature specimen is fixed on a top of the micro-channel cold platform through a first clamp, the low-temperature specimen is loaded with low temperature by driving the refrigerating fluid to circularly flow through the micro-channel pipeline, and the temperature of the low-temperature specimen is fed back and adjusted through a low-temperature thermocouple; and the micro-channel cold platform and a first heat insulation retainer are fixed through threads, a first acoustic emission sensor is embedded and mounted below the first heat insulation retainer, and the first heat insulation retainer and a first acoustic emission embedded platform are connected to the cooling platform through first long bolts and first nuts.

The high-temperature loading unit is mounted beside the low-temperature loading unit in parallel and shares the same horizontal sliding rail, so that high-temperature loading on the high-temperature specimen is achieved; a heating platform is mounted on a second bearing plate of a second vertical sliding table, a first eddy current induction coil of the heating platform heats a heat conduction platform in a second heat insulation retainer and the high-temperature specimen clamped at a top of the heat conduction platform, and the temperature is fed back and adjusted through a high-temperature thermocouple; and the heat conduction platform is connected to the second heat insulation retainer by threads, a second acoustic emission sensor is embedded and mounted below the second heat insulation retainer, and the second heat insulation retainer and a second acoustic emission embedded platform are connected to the heating platform through second long bolts and second nuts.

The optical-infrared in-situ monitoring module comprises an optical imaging unit and an infrared imaging unit; the optical imaging unit is configured to perform real-time in-situ monitoring on the dynamic propagation behavior of micro-area cracks in the impact indentation process; the optical imaging unit mainly comprises a high-speed camera and a supporting arm, a zoom magnifying lens and a macro lens are mounted on the high-speed camera, a camera base is connected to a bearing pin through a rotating pin, the bearing pin and a through hole on the supporting arm form a rotating pair, and the supporting arm is further fixed on a rear inner wall of the environmental chamber through a bolt; the infrared imaging unit is configured to perform in-situ monitoring on the temperature distribution and the dynamic temperature gradient of the test micro-area, and comprises an infrared thermal imager and a bracket, wherein a thermal imager lens on the infrared thermal imager is internally provided with an optical filter; and a base of the thermal infrared imager is connected to the bracket through a pin and is further fixed on a left inner wall of the environmental chamber.

The electromagnetic-piezoelectric coupling impact module is formed by two-stage driving of the electromagnetic linear motor and the piezoelectric stack, and the piezoelectric stack completes indentation after the electromagnetic linear motor achieves long-range approach; a head part of the piezoelectric stack is fixed in a preload support, a tail output end of the piezoelectric stack is connected to a flexible hinge for amplifying displacement, an output end of the flexible hinge is connected to a load sensor, and the other end of the load sensor is connected to a heat insulation pressing rod and supported by a bearing; the heat insulation pressing rod is connected to a heat conduction pressing rod by using a heat insulation ring and a heat insulation baffle for achieving heat insulation, and a tip of the heat conduction pressing rod is embedded and mounted with an indenter and a copper wire; when a high-temperature test is performed, a second eddy current induction coil on the heating base is turned on to heat the heat conduction pressing rod and the indenter, the copper wire adjacent to the indenter is connected to the high-temperature specimen to conduct heat for achieving isothermal contact, when the indenter and the high-temperature specimen are synchronously heated to a preset temperature, the piezoelectric stack drives the indenter to indent the high-temperature specimen according to a preset strain rate, a displacement measuring platform is arranged between a flexible hinge base and the heating base through a positioning guide rail, and a laser displacement sensor carried by the displacement measuring platform collects impact displacement; when the low-temperature test is performed, the low-temperature loading unit is moved to the front side of the electromagnetic-piezoelectric coupling impact module by the horizontal sliding rail, the heating base is removed, the heat conduction pressing rod is replaced by a refrigeration pressing rod, the refrigerating fluid is introduced into the refrigeration pressing rod to cool the indenter, the indenter is driven to perform an impact indentation test after the indenter and the low-temperature specimen are cooled to a preset temperature, and the same laser displacement sensor is used to obtain impact displacement and load data.

A two-dimensional piezoelectric driving platform is fixed on the electromagnetic linear motor and drives a bearing platform to move, so that dot-matrix impact indentation is achieved.

The microscopic imaging module is composed of a microscopic lens and a base, the base is connected to a lens arm through a rotating pin, a lens tube moves in a sliding groove through an adjusting knob to achieve focusing, and meanwhile, a lens converter can achieve switching of optical lenses with different magnifications (20× optical lens 9.9, 100× optical lens 9.7 and 500× optical lens 9.8).

The present invention has the beneficial effects that: the in-situ micro-nano impact indentation testing instrument provided by the present invention has the advantages of wide temperature range, high strain rate and high measurement precision; constructs a high/low temperature environment similar to the service working condition of the material through eddy current induction heating and supercooled liquid circulation in the micro-channel; indents a specimen through coupling impact of the electromagnetic linear motor and the piezoelectric stack; obtains data such as load and displacement in a test process through a high-precision sensor to calculate mechanical property parameters of the material; and obtains mechanical behaviors such as surface morphology-temperature distribution-defect nucleation of a test micro-area in real time through an optical-infrared-acoustic emission in-situ monitoring system, thereby providing the method and instrument support for revealing a microscopic failure mechanism and a property evolution rule of the material under the high/low temperature impact condition.

BRIEF DESCRIPTION OF DRAWINGS

The drawings illustrated herein are used to provide a further understanding of the present invention and constitute a part of the application. The illustrative examples and descriptions of the present invention are used to explain the present invention and do not constitute improper limitations to the present invention.

Figure 1:
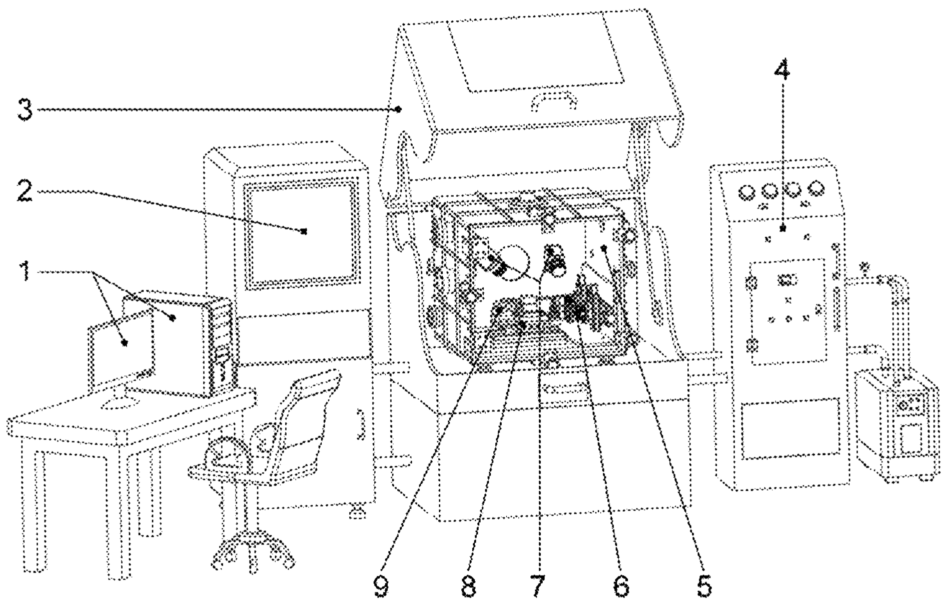
FIG. 1 is a schematic diagram of an overall structure of the present invention.

In the drawings: 1: host; 2: electronic control module; 3: vibration isolation shell; 4: nitrogen generation module; 5: environmental chamber; 6: high/low temperature loading module; 6.1: low-temperature loading unit; 6.1.1: first vertical sliding table; 6.1.2: first bearing plate; 6.1.3: first acoustic emission sensor; 6.1.4: horizontal sliding rail; 6.1.5: inlet pipeline; 6.1.6: cooling platform; 6.1.7: first acoustic emission embedded platform; 6.1.8: first heat insulation retainer; 6.1.9: first nut; 6.1.10: first clamp; 6.1.11: low-temperature specimen; 6.1.12: low-temperature thermocouple; 6.1.13: micro-channel cold platform; 6.1.14: first long bolt; 6.1.15: outlet pipeline; 6.2: high-temperature loading unit; 6.2.1: second vertical sliding table; 6.2.2: second bearing plate; 6.2.3: second acoustic emission sensor; 6.2.4: heating platform; 6.2.5: second acoustic emission embedded platform; 6.2.6: second long bolt; 6.2.7: second heat insulation retainer; 6.2.8: first eddy current induction coil; 6.2.9: second nut; 6.2.10: heat conduction platform; 6.2.11: second clamp; 6.2.12: high-temperature specimen; 6.2.13: high-temperature thermocouple; 7: optical-infrared in-situ monitoring module; 7.1: optical imaging unit, 7.1.1: high-speed camera; 7.1.2: camera base; 7.1.3: rotating pin; 7.1.4: supporting arm; 7.1.5: bearing pin; 7.1.6: zoom magnifying lens; 7.1.7: macro lens; 7.2: infrared imaging unit; 7.2.1: thermal imager lens; 7.2.2: thermal imager bracket; 7.2.3: pin; 7.2.4: thermal imager base; 7.2.5: infrared thermal imager; 8: electromagnetic-piezoelectric coupling impact module; 8.1: electromagnetic linear motor; 8.2: two-dimensional piezoelectric driving platform; 8.3: bearing platform; 8.4: flexible hinge base; 8.5: piezoelectric stack; 8.6: preload support; 8.7: refrigeration pressing rod; 8.8: positioning guide rail; 8.9: displacement measuring platform; 8.10: heating base; 8.11: second eddy current induction coil; 8.12: laser displacement sensor; 8.13: flexible hinge; 8.14: load sensor; 8.15: bearing; 8.16: heat insulation pressing rod; 8.17: heat insulation baffle; 8.18: heat insulation ring; 8.19: heat conduction pressing rod; 8.20: indenter; 8.21: copper wire; 9.1: microscope base; 9.2: rotating pin; 9.3: lens arm; 9.4: sliding groove; 9.5: adjusting knob; 9.6: lens tube; 9.7: 100× optical lens; 9.8: 500× optical lens; 9.9: 20× optical lens; and 9.10: lens converter.

DETAILED DESCRIPTION OF EMBODIMENTS

The following clearly and completely describes the technical solutions in embodiments of the present invention with reference to the drawings. It is clear that the described embodiments are merely a part rather than all of embodiments of the present invention. Based on the embodiments of the present invention, all other embodiments obtained by those of ordinary skill in the art without creative effort fall within the protection scope of the present invention. In order to make the objectives, features, and advantages of the present invention more apparent and understandable, the following describes the present invention in detail with reference to the accompanying drawings and specific implementations. In the present invention, "/" and "-" in "high/low temperature", optical-infrared and electromagnetic-piezoelectric respectively represent "or" and "and".

Referring to FIGS. 1 to 7, the in-situ micro-nano impact indentation testing instrument of the present invention comprises a host 1, an electric control module 2, a vibration isolation shell 3, a nitrogen generation module 4, an environmental chamber 5, a high/low temperature loading module 6, an optical-infrared in-situ monitoring module 7, an electromagnetic-piezoelectric coupling impact module 8, and a microscopic imaging module 9. The nitrogen atmosphere provided by the nitrogen generation module 4 and the environmental chamber 5 can avoid high-temperature oxidation and low-temperature frosting, the high/low-temperature loading module 6 performs high-temperature or low-temperature loading on a high-temperature specimen and a low-temperature specimen, the optical-infrared in-situ monitoring module 7 and the first and second acoustic emission sensors form an in-situ monitoring system, the electromagnetic-piezoelectric coupling impact module 8 can drive the indenter 8.20 to horizontally impact the specimen, and the microscopic imaging module 9 is configured to select a test area before impact test and observe residual morphology after impact. Nitrogen is introduced into the environmental chamber, and after a test area is determined by the microscopic imaging module, the electromagnetic-piezoelectric coupling impact module mounted below can drive an indenter to indent the specimen; the high/low temperature loading module can use an eddy current induction coil to heat the specimen or load low temperature on the specimen through the refrigerating fluid, and first and second acoustic emission sensors embedded in the high/low temperature loading module can monitor the surface crack propagation of the specimen; and the optical-infrared in-situ monitoring module can perform real-time high-speed optical imaging and infrared imaging on the impact indentation process. The present invention can perform micro-nano impact indentation testing on the material at high or low temperatures, and reveal in situ the mechanical property evolution law and the deformation damage mechanism of the material under impact indentation.

FIG. 1 is a schematic diagram of an overall appearance of a micro-nano impact indentation tester. An analysis software can be mounted on the host 1 for processing experimental data; a circuit channel is connected between the electric control module 2 and the vibration isolation shell 3 and is configured for data transmission and communication control; the nitrogen generation module 4 is configured to produce high-purity nitrogen, and a gas pipeline is connected between the nitrogen generation module and the vibration isolation shell 3; and the environmental chamber 5 is provided with a sealing interface for data transmission and nitrogen loading, observation windows are reserved on the back of a cabin door and a chamber body, the cabin door needs to be closed before the experiment begins, the valve is screwed, and the nitrogen is introduced into the chamber body by opening the switch of the nitrogen generation module 4.

Figure 2:
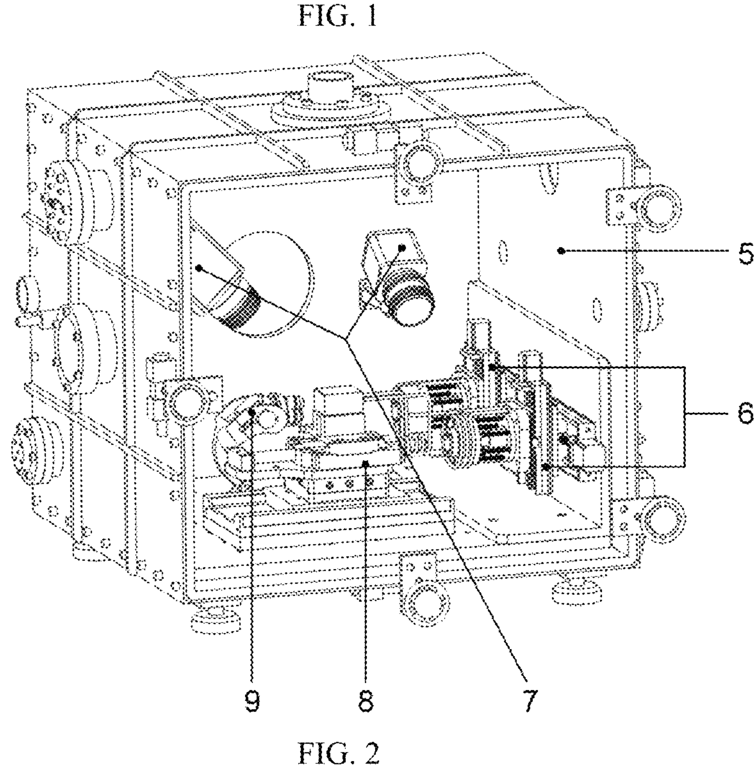
FIG. 2 is a schematic diagram of an internal layout of an environmental chamber according to the present invention.

FIG. 2 is a schematic diagram of a layout of core components in the environmental chamber 5. A high-temperature specimen 6.1.12 (or a low-temperature specimen 6.1.11) and a second acoustic emission sensor 6.2.3 (or a first acoustic emission sensor 6.1.3) are fixed on a high (low) temperature loading module 6 arranged on a right inner wall of the chamber body, and the high-temperature specimen 6.1.12 can be loaded with high temperature (or the low temperature specimen 6.1.11 is loaded with low temperature) based on a requirement and crack propagation information can be collected in real time; an optical imaging unit 7.1 of the optical-infrared in-situ monitoring module 7 is mounted on a rear inner wall of the environmental chamber 5, an infrared imaging unit 7.2 is mounted on the left side of the environmental chamber 5, and lenses of the two imaging units are focused on a to-be-impacted area of the high-temperature specimen (or the low-temperature specimen); an electromagnetic-piezoelectric coupling impact module 8 and a microscopic imaging module 9 are mounted on a marble plate at the bottom of the environmental chamber 5, and lenses (100× optical lens 9.7, 500× optical lens 9.8 and 20× optical lens 9.9) of the microscopic imaging module 9 and an indenter 8.20 of the electromagnetic-piezoelectric coupling impact module 8 are mounted at the same height.

Figure 3:
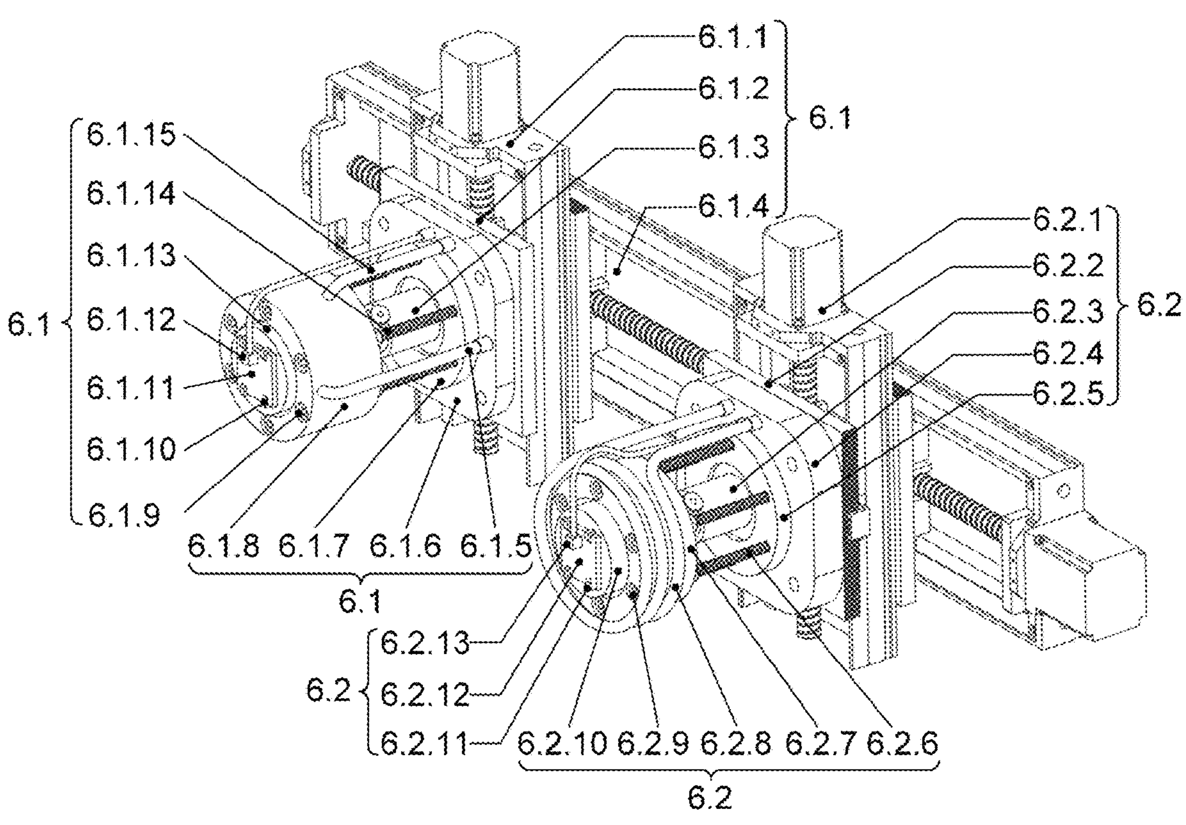
FIG. 3 is an axonometric diagram of a high/low temperature loading module according to the present invention.

Referring to FIG. 3, the high/low temperature loading module 6 comprises a high-temperature loading unit 6.2 and a low-temperature loading unit 6.1. The low-temperature loading unit 6.1 is mounted on the horizontal sliding rail 6.1.4 and the first vertical sliding table 6.1.1, and the low-temperature specimen 6.1.11 can move along with the two sliding tables so as to change a test area; the first bearing plate 6.1.2 on the first vertical sliding table 6.1.1 is connected to a cooling platform 6.1.6 through a bolt, and the refrigerating fluid in the cooling platform 6.1.6 flows into the micro-channel cold platform 6.1.13 through an inlet pipeline 6.1.5 and flows out through a pipeline 6.1.15 during low-temperature testing; a tortuous micro-channel is processed inside the micro-channel cold platform 6.1.13 and can be used for circulating flow of the refrigerating fluid, a first clamp 6.1.10 at the top of the micro-channel cold platform is fixed with a low-temperature specimen 6.1.11, the low-temperature specimen is tightly attached to the upper surface of the micro-channel cold platform and is fixed by the first clamp 6.1.10, heat is taken away when the refrigerating fluid flows circularly, the micro-channel cold platform and the low-temperature specimen are cooled, and a low-temperature thermocouple 6.1.12 tightly attached to the surface of the low-temperature specimen can feed back and adjust the temperature. In order to improve the refrigeration efficiency, a first heat insulation retainer 6.1.8 on the periphery of the micro-channel cold platform is made of heat insulation materials, and the first heat insulation retainer 6.1.8 avoids the damage of low temperature to other components in the environmental chamber; the micro-channel cold platform 6.1.13 is embedded and mounted in the first heat insulation retainer 6.1.8 by threads; the first acoustic emission sensor 6.1.3 is embedded and mounted below the first heat insulation retainer for monitoring crack nucleation and propagation in the impact indentation process, and the first heat insulation retainer 6.1.8 is connected to the cooling platform 6.1.6 through six first long bolts 6.1.14.

The structure of the high-temperature loading unit 6.2 is similar to that of the low-temperature loading unit, the high-temperature loading unit and the low-temperature loading unit are jointly (in parallel) mounted on the same horizontal sliding rail 6.1.4, and a second vertical sliding table 6.2.1 is mounted on the horizontal sliding rail 6.1.4; a second bearing plate 6.2.2 on the second vertical sliding table 6.2.1 is connected to a heating platform 6.2.4 through a bolt, and a first eddy current induction coil 6.2.8 on the heating platform 6.2.4 can heat a heat conduction platform 6.2.10 in a second heat insulation retainer 6.2.7 and the high-temperature specimen 6.2.12; the high-temperature specimen 6.2.12 on the heat conduction platform 6.2.10 is fixed on the top of the heat conduction platform by the second clamp 6.2.11 (a ceramic clamp), and the feedback and adjustment of the temperature is achieved by a high-temperature thermocouple 6.2.13 attached to the high-temperature specimen 6.2.12 during heating; and the second heat insulation retainer 6.2.7 is arranged outside the heat conduction platform, the second acoustic emission sensor 6.2.3 is also embedded and mounted below the second heat insulation retainer 6.2.7 and configured to monitor crack nucleation and propagation in the high-temperature impact indentation process, and the second heat insulation retainer 6.2.7 is connected to the heating platform 6.2.4 through second long bolts 6.2.6.

Figure 4:
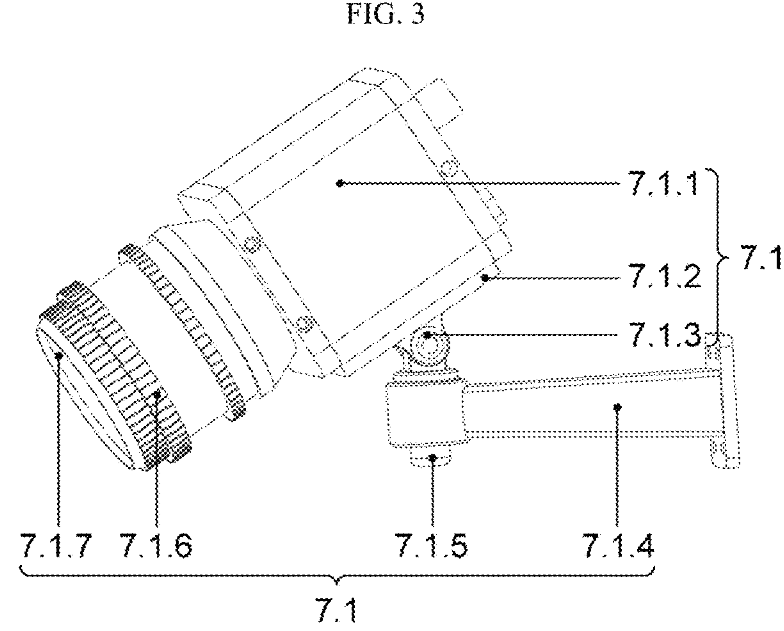
FIG. 4 is an axonometric diagram of an optical imaging unit of an optical-infrared in-situ monitoring module according to the present invention.
Figures 5, 6:
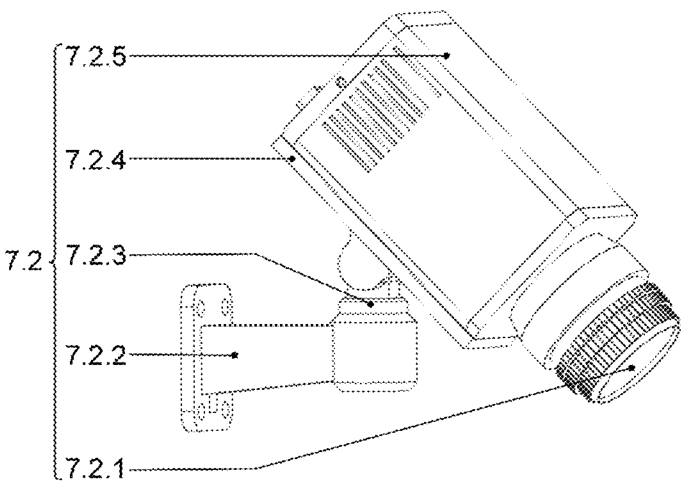
FIG. 5 is an axonometric diagram of an infrared imaging unit of an optical-infrared in-situ monitoring module according to the present invention.
FIG. 6 is an axonometric diagram of an electromagnetic-piezoelectric coupling impact module according to the present invention.

Referring to FIGS. 4 and 5, the optical-infrared in-situ monitoring module 7 comprises an optical imaging unit 7.1 and an infrared imaging unit 7.2. A main component of the optical imaging unit 7.1, a high-speed camera 7.1.1, is equipped with a zoom magnifying lens 7.1.6 and a macro lens 7.1.7 for adjusting the focal length and magnification. A camera base 7.1.2 is connected to the bearing pin 7.1.5 through the rotating pin 7.1.3, the bearing pin 7.1.5 and the through hole on the supporting arm 7.1.4 form a rotating pair that is further fixed on the inner wall of the environmental chamber 5, and the focal length, the magnification and the degree of freedom of the high-speed camera are adjusted before the experiment, so that the high-speed camera focuses on a to-be-tested area of the specimen. The high-speed camera 7.1.1 can adjust the optical imaging area by two rotational degrees of freedom provided by the rotating pin 7.1.3 and the bearing pin 7.1.5. Similarly, the main component of the infrared imaging unit 7.2 is a thermal imaging camera 7.2.5, the base 7.2.4 of which is connected to the thermal imager bracket 7.2.2 by a pin 7.2.3 and is further fixed to the inner wall of the environmental chamber 5, and the rotational degree of freedom provided by the pin 7.2.3 can be used to adjust the infrared imaging area. Before the experiment, the infrared imaging field of view is adjusted by rotating the pin, and the optical filter is mounted in the lens 7.2.1 of the pin, so that the imaging in a temperature range of −40° C. to 1000° C. can be completed.

Referring to FIG. 6, the electromagnetic-piezoelectric coupling impact module 8 is configured to drive an indenter to impact and indent the high-temperature specimen (or the low-temperature specimen), and is formed by two-stage driving of an electromagnetic linear motor 8.1 and a piezoelectric stack 8.5, and impact speed and strain rate can be set based on a requirement during testing. The two-dimensional piezoelectric driving platform 8.2, the piezoelectric stack 8.5 and the heating base 8.10 are all mounted on an electromagnetic linear motor 8.1, and long-range approach is synchronously achieved along with the electromagnetic linear motor 8.1. Before the high-temperature impact indentation testing, the second eddy current induction coil 8.11 connected to the heating base 8.10 can heat the indenter 8.20 and the electric conduction pressing rod 8.19, and the temperature of the indenter 8.20 is kept consistent with that of the high-temperature specimen 6.2.12 through the heat conduction of the copper wire 8.21; under the action of pulse voltage, the displacement output by the piezoelectric stack 8.5 is amplified by the flexible hinge 8.4 and then transmitted to the indenter 8.20, the indenter is driven to impact and indent the high-temperature specimen, and the load sensor 8.14 and the laser displacement sensor 8.12 respectively collect load and displacement in the test process; when the low-temperature impact indentation testing is performed, the low-temperature loading unit 6.1 is moved to the front side of the electromagnetic-piezoelectric coupling impact module through the horizontal sliding rail 6.1.4, the heating base 8.10 is removed, and the heat conduction pressing rod 8.19 is replaced by the refrigeration pressing rod 8.7; in addition, the piezoelectric stack 8.5 and two-dimensional piezoelectric driving platform 8.2 can realize dot matrix impact indentation test.

A head part of the piezoelectric stack is fixed in a preload support 8.6, a tail output end of the piezoelectric stack is connected to a flexible hinge 8.13 for amplifying displacement, an output end of the flexible hinge is connected to a load sensor 8.14; in order to protect the load sensor, a heat insulation pressing rod 8.16, a heat insulation baffle 8.17 and a heat insulation ring 8.18 are connected between the load sensor and the heat conduction pressing rod 8.19; the tip of the heat conduction pressing rod 8.19 is embedded and mounted with an indenter 8.20 and a copper wire 8.21, wherein the indenter is made of high-temperature-resistant tungsten carbide material; when the high-temperature test is performed, the second eddy current induction coil 8.11 on the heating base 8.10 is turned on to heat the pressing rod and the indenter, the copper wire adjacent to the indenter is connected to the specimen to achieve isothermal heat conduction so as to reduce temperature drift, when the indenter and the high-temperature specimen 6.2.12 are synchronously heated to a preset temperature, the piezoelectric stack driving indenter indents the specimen according to a preset strain rate, and the laser displacement sensor 8.12 carried by the displacement measuring platform 8.9 is configured to collect impact displacement; and when the low-temperature test is performed, the low-temperature loading unit 6.1 is moved to the front side of the electromagnetic-piezoelectric coupling impact module by the horizontal sliding rail 6.1.4, the heating base is removed, the heat conduction pressing rod is replaced by a refrigeration pressing rod 8.7, the refrigerating fluid is introduced into the refrigeration pressing rod to cool the indenter, the indenter is driven to perform an impact indentation test after the indenter and the low-temperature specimen 6.1.11 are cooled to a preset temperature, and the same sensor is used to obtain impact displacement and load data. In addition, the two-dimensional piezoelectric driving platform 8.2 is fixed on the electromagnetic linear motor and can drive a bearing platform 8.3 to move, so that dot-matrix impact indentation is achieved.

Figure 7:
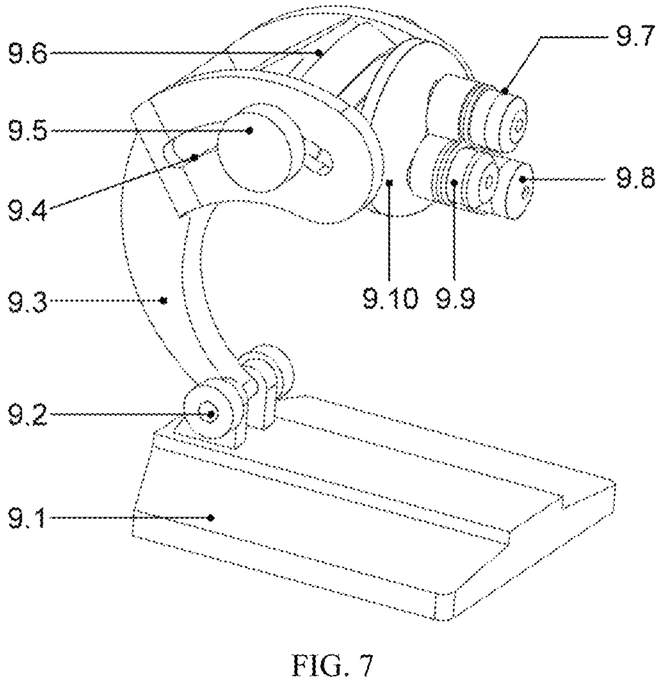
FIG. 7 is an axonometric diagram of a microscopic imaging module according to the present invention.

Referring to FIG. 7, the microscopic imaging module 9 is configured to select an impact area before indentation test and observe residual morphology after impact. The base 9.1 and the lens arm 9.3 are connected by a rotating pin 9.2, so that the height adjustment can be achieved. The adjusting knob 9.5 can drive the lens tube 9.6 to move in the chute 9.4, the adjusting knob 9.5 can be matched with the sliding groove 9.4 to achieve rotation and focal length adjustment of the lens tube 9.6, and the lens converter 9.10 can achieve switching of three lenses with different magnifications (100× optical lens 9.7, 500× optical lens 9.8 and 20× optical lens 9.9).

When the in-situ micro-nano impact indentation testing instrument of the present invention is used, the working process is as follows.

The high-temperature specimen (or the low-temperature specimen) is clamped on a clamp of a heat conduction platform (or a micro-channel cold platform) of a high-temperature (or low-temperature) testing module, a horizontal sliding table and a second vertical sliding table (or a first vertical sliding table) are adjusted, and the specimen is moved to the front side of a microscopic imaging module; after an impact area is determined by the microscopic imaging system, the specimen is moved to the front side of the indenter of the electromagnetic-piezoelectric coupling impact module in parallel only through a horizontal sliding rail; an electromagnetic linear motor is driven to approach the specimen in a long range; the degree of freedom, the focal length and the magnification of the high-speed camera are adjusted to focus the to-be-tested area of the specimen; and the degree of freedom of the thermal imager is adjusted to focus the infrared imaging field of view, and parameters such as a frame rate and an infrared imaging range are adjusted.

Before the test is started, the cabin door of the environmental chamber is closed, the sealing valve is screwed, and the switch of the nitrogen generation module is opened; after the nitrogen concentration and the pressure reach set values, the electromagnetic-piezoelectric coupling impact module an the first and second eddy current induction coils on the high-temperature loading unit are turned on to synchronously heat the high-temperature specimen and the indenter (or a cooling liquid is introduced into a micro-channel cold platform of a refrigeration pressing rod of the electromagnetic-piezoelectric coupling impact module and a low-temperature loading module to cool the low-temperature specimen), and a high-temperature thermocouple (or a low-temperature thermocouple) is configured for the feedback and adjustment of the temperature until the indenter and the specimen reach the set temperature.

The high-speed camera, the infrared thermal imager, the second acoustic emission sensor (or the first acoustic emission sensor), the load sensor and the laser displacement sensor are triggered to collect signals; the piezoelectric stack is triggered to impact and indent the specimen, and the piezoelectric stack automatically stops advancing when the specimen is indented to a preset depth; after the load is kept for a period of time based on a requirement, the piezoelectric stack retreats at a set speed until the piezoelectric stack leaves the specimen; the collection of various information is stopped after the test is completed, and the eddy current induction coil is turned off (or the flow of the refrigerating fluid is blocked).

After the specimen and the indenter are cooled (or warmed) to room temperature, the nitrogen is unloaded, the electromagnetic linear motor is driven away from the specimen, and the cabin door is opened to take out the specimen.

The above described contents are only preferred examples of the present invention and are not intended to limit the present invention. For those skilled in the art, the present invention can be modified and varied. Any modification, equivalent replacement, or improvement made to the present invention shall fall within the protection scope of the present invention.

What is claimed is:

1. An in-situ micro-nano impact indentation testing instrument, wherein a high-temperature loading unit and a low-temperature loading unit of a high/low-temperature loading module are mounted in parallel on a right side wall of an environmental chamber, an optical imaging unit and an infrared imaging unit of the optical-infrared in-situ monitoring module are respectively arranged on a left side wall and a rear side wall of the environmental chamber, and both an electromagnetic-piezoelectric coupling impact module and a microscopic imaging module are mounted at a bottom of the environmental chamber;

wherein the electromagnetic-piezoelectric coupling impact module is provided with an indenter that horizontally impacts a high-temperature specimen clamped on the high-temperature loading unit on a right side under the driving of an electromagnetic linear motor and a piezoelectric stack; the high-temperature and low-temperature loading units are fixed on the same horizontal sliding rail, and a motor on the horizontal sliding rail drives the low-temperature loading unit to move to a front side of the electromagnetic-piezoelectric coupling impact module, so that the switching from a high-temperature impact indentation test to a low-temperature impact indentation test is completed; in-situ monitoring is performed on the testing process by the optical-infrared in-situ monitoring module combined with a second acoustic emission sensor and a first acoustic emission sensor in the high-temperature and low-temperature loading units; and the microscopic imaging module is configured to select a test area before impact indentation and observe residual morphology after impact indentation.

2. The in-situ micro-nano impact indentation testing instrument according to claim 1, wherein the high/low temperature loading module comprises the high-temperature loading unit and the low-temperature loading unit; a first vertical sliding table of the low-temperature loading unit is mounted on a horizontal sliding rail, a first bearing plate of the first vertical sliding table is connected to a cooling platform, and a refrigerating fluid stored in the cooling platform flows into a micro-channel pipeline inside a micro-channel cold platform through an inlet pipeline and then flows out through an outlet pipeline to return to the cooling platform;

wherein a low-temperature specimen is fixed on a top of the micro-channel cold platform through a first clamp, the low-temperature specimen is loaded with low temperature by driving the refrigerating fluid to circularly flow through the micro-channel pipeline, and the temperature of the low-temperature specimen is fed back and adjusted through a low-temperature thermocouple; and the micro-channel cold platform and a first heat insulation retainer are fixed through threads, the first acoustic emission sensor is embedded and mounted below the first heat insulation retainer, and the first heat insulation retainer and a first acoustic emission embedded platform are connected to the cooling platform through first long bolts and first nuts.

3. The in-situ micro-nano impact indentation testing instrument according to claim 1, wherein the high-temperature loading unit is mounted beside the low-temperature loading unit in parallel and shares the same horizontal sliding rail, so that high-temperature loading on the high-temperature specimen is achieved;

wherein a heating platform is mounted on a second bearing plate of a second vertical sliding table, a first eddy current induction coil of the heating platform heats a heat conduction platform in a second heat insulation retainer and the high-temperature specimen clamped at a top of the heat conduction platform, and the temperature is fed back and adjusted through a high-temperature thermocouple; and the heat conduction platform is connected to the second heat insulation retainer by threads, wherein the second acoustic emission sensor is embedded and mounted below the second heat insulation retainer, and the second heat insulation retainer and a second acoustic emission embedded platform are connected to the heating platform through second long bolts and second nuts.

4. The in-situ micro-nano impact indentation testing instrument according to claim 1, wherein the optical-infrared in-situ monitoring module comprises an optical imaging unit and an infrared imaging unit;

wherein the optical imaging unit is configured to perform real-time in-situ monitoring on the dynamic propagation behavior of micro-area cracks in the impact indentation process;

the optical imaging unit mainly comprises a high-speed camera and a supporting arm, a zoom magnifying lens and a macro lens are mounted on the high-speed camera, wherein a camera base is connected to a bearing pin through a rotating pin, the bearing pin and a through hole on the supporting arm form a rotating pair, and the supporting arm is further fixed on a rear inner wall of the environmental chamber through a bolt;

the infrared imaging unit is configured to perform in-situ monitoring on the temperature distribution and the dynamic temperature gradient of the test micro-area, and comprises an infrared thermal imager and a bracket, wherein a thermal imager lens on the infrared thermal imager is internally provided with an optical filter; and a base of the thermal infrared imager is connected to the bracket through a pin and is further fixed on a left inner wall of the environmental chamber.

5. The in-situ micro-nano impact indentation testing instrument according to claim 1, wherein the electromagnetic-piezoelectric coupling impact module is formed by two-stage driving of the electromagnetic linear motor and the piezoelectric stack, and the piezoelectric stack completes indentation after the electromagnetic linear motor achieves long-range approach;

wherein a head part of the piezoelectric stack is fixed in a preload support, a tail output end of the piezoelectric stack is connected to a flexible hinge for amplifying displacement, an output end of the flexible hinge is connected to a load sensor, and the other end of the load sensor is connected to a heat insulation pressing rod and supported by a bearing;

wherein the heat insulation pressing rod is connected to a heat conduction pressing rod by using a heat insulation ring and a heat insulation baffle for achieving heat insulation, and a tip of the heat conduction pressing rod is embedded and mounted with an indenter and a copper wire.

6. The in-situ micro-nano impact indentation testing instrument according to claim 1, wherein a two-dimensional piezoelectric driving platform is fixed on the electromagnetic linear motor and drives a bearing platform to move, so that dot-matrix impact indentation is achieved.

7. The in-situ micro-nano impact indentation testing instrument according to claim 1, wherein the microscopic imaging module is composed of a microscopic lens and a base, the base is connected to a lens arm through a rotating pin, a lens tube moves in a sliding groove through an adjusting knob to achieve focusing, and meanwhile, a lens converter can achieve switching of optical lenses with different magnifications.

8. A testing method implemented by using the in-situ micro-nano impact indentation testing instrument according to claim 1, wherein when a high-temperature test is performed, a second eddy current induction coil on the heating base is turned on to heat the heat conduction pressing rod and the indenter, the copper wire adjacent to the indenter is connected to the high-temperature specimen to conduct heat for achieving isothermal contact, wherein when the indenter and the high-temperature specimen are synchronously heated to a preset temperature, the piezoelectric stack drives the indenter to indent the high-temperature specimen according to a preset strain rate, a displacement measuring platform is arranged between a flexible hinge base and the heating base through a positioning guide rail, and a laser displacement sensor carried by the displacement measuring platform collects impact displacement.

9. A testing method implemented by using the in-situ micro-nano impact indentation testing instrument according to claim 1, wherein when a low-temperature test is performed, the low-temperature loading unit is moved to a front side of the electromagnetic-piezoelectric coupling impact module by the horizontal sliding rail, the heating base is removed, the heat conduction pressing rod is replaced by a refrigeration pressing rod, the refrigerating fluid is introduced into the refrigeration pressing rod to cool the indenter, the indenter is driven to perform an impact indentation test after the indenter and the low-temperature specimen are cooled to a preset temperature, and the same laser displacement sensor is used to obtain impact displacement and load data.

* * * * *